United States Patent [19]
Sapra et al.

[11] Patent Number: 5,940,485
[45] Date of Patent: Aug. 17, 1999

[54] DATA INTERFACE CONNECTED IN LINE BETWEEN A KEYBOARD AND A KEYBOARD PORT OF A PERSONAL COMPUTER

[75] Inventors: Vipin C. Sapra; Luke M. Olsen, both of Portland, Oreg.

[73] Assignee: TriVium Systems, Inc, Portland, Oreg.

[21] Appl. No.: 08/874,609

[22] Filed: Jun. 12, 1997

[51] Int. Cl.⁶ .......................... H04M 1/56; H04M 15/06; H04M 11/00; H03K 17/94
[52] U.S. Cl. .......................... 379/142; 341/22; 379/90.01
[58] Field of Search .................................. 364/188, 189, 364/190, 705.05; 341/22; 379/90.01, 142, 428, 434, 440, 93.17, 354, 399; 395/800.01, 800.26, 501

[56] References Cited

U.S. PATENT DOCUMENTS

| | | | |
|---|---|---|---|
| 3,654,708 | 4/1972 | Brudner | 379/90.01 |
| 4,551,581 | 11/1985 | Doughty | 179/2 A |
| 4,582,956 | 4/1986 | Doughty | 179/2 A |
| 4,640,989 | 2/1987 | Riner et al. | 379/94 |
| 4,776,005 | 10/1988 | Petriccione et al. | 379/142 |
| 4,860,342 | 8/1989 | Danner | 379/96 |
| 4,894,861 | 1/1990 | Fujioka | 379/374 |
| 4,914,698 | 4/1990 | Quade et al. | 379/142 |
| 5,010,399 | 4/1991 | Goodman et al. | 358/85 |
| 5,054,055 | 10/1991 | Hanle et al. | 379/142 |
| 5,117,452 | 5/1992 | Callele et al. | 379/98 |
| 5,146,490 | 9/1992 | Beckman | 379/113 |
| 5,343,516 | 8/1994 | Callele et al. | 379/98 |
| 5,375,165 | 12/1994 | Haber et al. | 341/22 |
| 5,414,457 | 5/1995 | Kadowaki et al. | 348/14 |
| 5,533,102 | 7/1996 | Robinson et al. | 379/67 |
| 5,561,708 | 10/1996 | Remillard | 379/96 |
| 5,566,232 | 10/1996 | Sizer, II | 379/142 |
| 5,771,281 | 6/1998 | Batten, Jr. | 379/93.23 |
| 5,787,259 | 7/1998 | Haroun et al. | 379/93.01 |

OTHER PUBLICATIONS

"Traffic cop for your PC", Elisa Williams, *The Oregonian*, Portland, Oregon, Apr. 27, 1997, pp. B1, B2.

*Primary Examiner*—Curtis A. Kuntz
*Assistant Examiner*—Rexford N. Barnie
*Attorney, Agent, or Firm*—Stoel Rives LLP

[57] ABSTRACT

A telecommunications data interface (24) installs in line between a PC keyboard (20) and a PC (10) and transparently transfers data between the keyboard and the PC. The keyboard has a relatively slow manual data rate at which the keyboard data are synchronously transferred into the PC by a clock line (46). Caller ID data bytes extracted from a telephone line (34, 36) are preceded by a tag byte, impressed on a keyboard data line (44), and synchronously transferred into the PC using the same clock line. Keyboard device driver software installed in the PC separates the keyboard data from the caller ID data and transfers both to appropriate locations for processing and storage. The caller ID interface substantially eliminates the data conflicts and interrupt availability problems that are possible in prior RS-232 based caller ID interfaces. Processors (50, 52) and a memory (62) in the caller ID interface provide self-testing, caller ID data processing, stand alone operation, and inbound and outbound telephone call record storage. Call records include caller ID logging, call origination date and time, and call duration timing.

20 Claims, 2 Drawing Sheets

DATA INTERFACE CONNECTED IN LINE BETWEEN A KEYBOARD AND A KEYBOARD PORT OF A PERSONAL COMPUTER

RELATED PATENT APPLICATIONS

Not applicable

FEDERALLY SPONSORED RESEARCH OR DEVELOPMENT

Not applicable

1. Technical Field

This invention relates to data interface systems and more particularly to an apparatus and method for using a keyboard interface to transfer telecommunications data to and from a personal computer.

2. Background of the Invention

The personal computer ("PC") industry has experienced rapid growth of PC peripherals, such as printers, mice, modems, drawing tablets, scanners, joysticks, storage devices, sound and video devices, telecommunications controllers, and networking equipment. All of these peripherals are designed to run employing the same PC interfacing techniques that were introduced long before many such peripherals became available. As a result, current PC technology may not be capable of supporting as many attached peripherals as present day users demand.

The PC industry has responded by developing new standards for attaching multiple peripherals to PCs. One such standard is the Universal Serial Bus ("USB"), for use with Intel® processor-based PCs. However, the USB has yet to gain acceptance in the marketplace partly because it requires purchasing new USB-compatible peripherals.

Some peripherals attach to PCs through bus interface cards, a technique that is particularly effective for achieving high data transfer rates. However, such interface cards add costs and require hardware and software installation skills that are beyond the abilities of many users.

PCs were originally designed to include four communications ports (referred to as COM1 to COM4) for attaching peripherals employing the well-known RS-232 serial interface port. However in a standard PC configuration, only two of the four RS-232 ports are simultaneously usable. With the introduction of the Microsoft Windows operating system and the popularity of online services, both available RS-232 ports have typically been used to attach a mouse and a modem. Moreover, the new operating systems have not eased access to the other two RS-232 ports.

Because RS-232 ports are optimized to support communications devices, telecommunications controllers are particularly impacted by the lack of available RS-232 ports. Telecommunications controllers are rapidly growing in capability to adapt to the many telecommunications services, such as Custom Local Area Signal Services ("CLASS"), some of which are described in U.S. Pat. No. 4,551,581 for METHOD AND APPARATUS FOR SENDING A DATA MESSAGE TO A SELECTED STATION DURING A SILENT INTERVAL BETWEEN RINGING. Small businesses and consumers are increasingly using their PCs to manage and control multiple telephone lines among telephone handsets, answering machines, facsimile machines, computers, and file servers. An important CLASS call management service is caller identification ("ID"), which allows a call recipient to screen incoming calls before they are answered. Caller ID data are usually sent to the call recipient by the telephone service provider between telephone ringing signals or during a call waiting signal, but can also be sent any time during a call.

The RS-232 port availability problem is somewhat addressed in U.S. Pat. No. 5,343,516 for TELEPHONE INTERFACE FOR A COMPUTER FOR RECEIVING AND TRANSMITTING INFORMATION DURING THE SILENT INTERVAL BETWEEN RINGING ("Callele et al."), which describes an RS-232 loopthrough interface that employs a control logic block to insert caller ID data into a buffered RS-232 data stream by using a "byte stuffing" technique. Callele et al. also mention that serial or parallel printer interface port embodiments are possible. However, all of these embodiments "stuff" relatively high data rate caller ID data and RS-232 data into the same interface port, a technique that invites data conflict problems and PC operating system-related interrupt availability problems.

What is needed, therefore, is a simple and unobtrusive bidirectional data interface to a PC that neither uses one of the PC's RS-232 ports nor requires the purchase of additional interface devices, such as USB interface hardware. Moreover, such an interface should not introduce any data conflicts or interrupt availability problems.

SUMMARY OF THE INVENTION

An object of this invention is, therefore, to provide a simple and unobtrusive bidirectional PC data interface that does not use one of the PC's RS-232 ports.

Another object of this invention is to provide a telecommunications data and caller ID interface apparatus and method with which most existing PC installations can be retrofitted.

Still another object of this invention is to provide a PC data interface apparatus and method that does not introduce any data conflicts or interrupt availability problems.

A further object of this invention is to provide a telecommunication data to PC bidirectional interface apparatus and method that reduces some of the PC data processing burden by processing and storing telecommunication data that are exchanged with the PC.

A telecommunication data to PC interface of this invention is installed in line between the PC keyboard and the PC and maintains transparent keyboard data transfers between the keyboard and the PC. The keyboard, being a manually operated device, has a relatively slow data rate in which the data are synchronously transferred into the PC by a clock line. Telecommunication data including caller ID data bytes extracted from at least one telephone line are preceded by a tag byte, impressed on the keyboard data line, and synchronously transferred into the PC using the same clock line. Keyboard device driver software installed in the PC separates the keyboard data from the caller ID data and transfers both to appropriate locations for processing and storage. An advantage of this invention is that it substantially eliminates the data conflicts and interrupt availability problems that are possible in prior RS-232 based caller ID interfaces. Another advantage of this invention is that a processor and memory in the caller ID interface provides self-testing, caller ID data processing, stand alone operation, and telephone call data record storage. Call records include caller ID logging, call origination date and time, and call duration timing.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
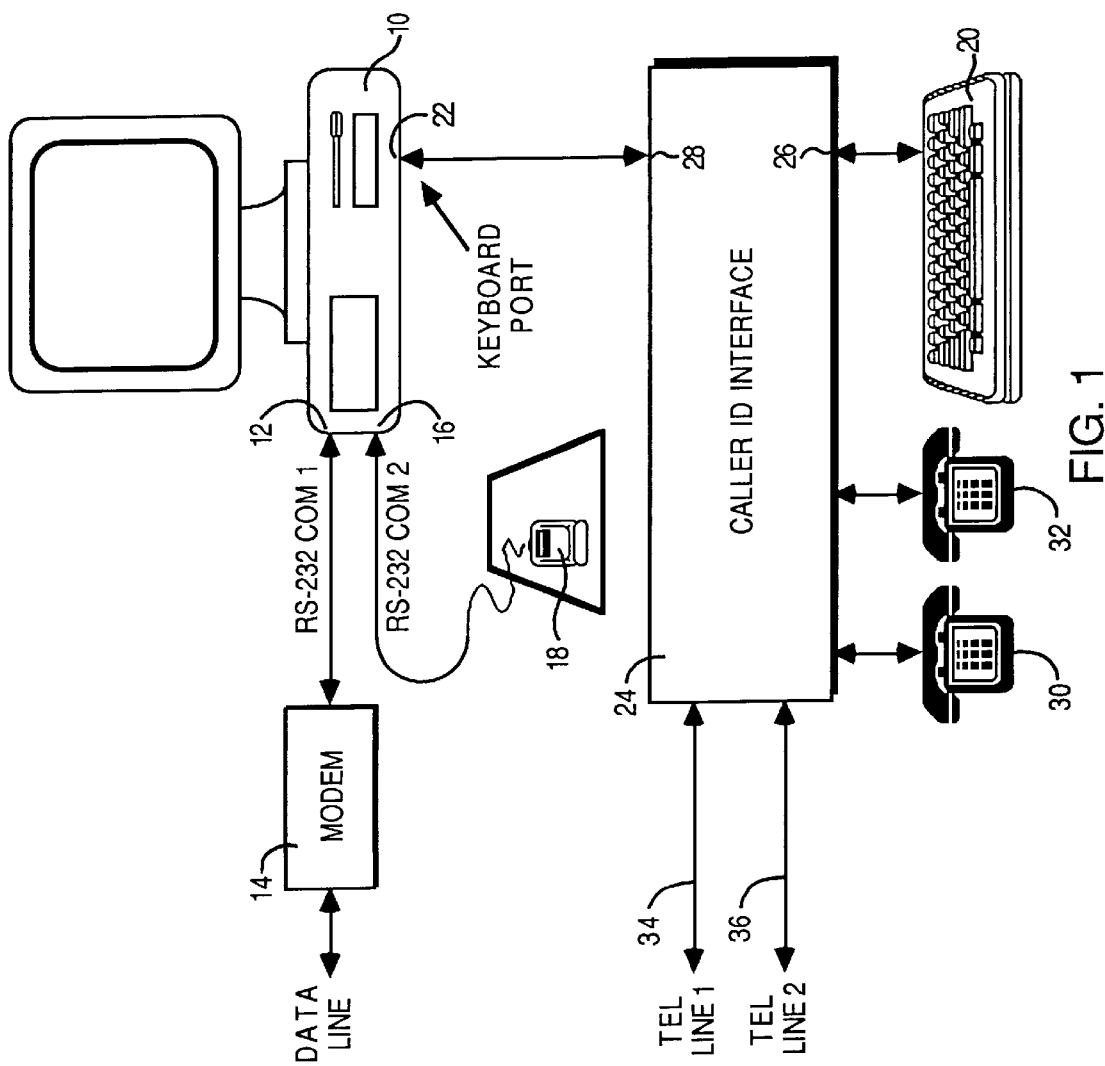
FIG. 1 is a simplified electrical block diagram showing the interconnection among a PC, its RS-232 peripherals, a PC keyboard, and a caller ID interface of this invention.

FIG. 1 shows a conventional PC 10 having a COM-1 RS-232 interface port 12 electrically connected to a modem 14 for intercommunication with a data line and a COM-2 RS-232 interface port 16 electrically connected to a mouse 18 for user interaction with programs running on PC 10. A PC conventional keyboard 20 that normally connects to a keyboard port 22 on PC 10 is, instead, electrically connected to a telecommunication data interface 24 (hereafter "interface 24") of this invention, which passes data generated by keyboard 20 through to keyboard port 22. In particular, interface 24 receives keyboard 20 data at a first passthrough port 26 and transparently conveys it to a second passthrough port 28 for electrical connection to keyboard port 22 on PC 10. In addition, interface 24 electrically connects telephones 30 and 32 to associated telephone lines 34 and 36. While two telephones and associated telephone lines are shown, this invention is readily adaptable to single or multiple telephone embodiments and to other than telecommunications data environments. However, the preferred telecommunications data interface embodiment is described below.

Interface 24 performs multiple functions. For incoming telephone calls, preferred functions include sensing calls on telephone lines 34 and 36, extracting caller ID data, sending the caller ID data out second passthrough port 28 to PC 10, displaying the caller ID data on a display, computing the duration of calls, storing call-related data in a memory, and sending the stored data through second passthrough port 28 to PC 10. For outbound calls, preferred functions include sensing calls initiated by telephones 30 and 32; extracting dual-tone multi-frequency ("DTMF") data from telephone lines 34 and 36; displaying the DTMF data on the display; computing the date, origination time, and duration of each call; displaying call-related data on the display; storing the call-related data in the memory; and sending the stored data through second passthrough port 28 to PC 10.

Interface 24 performs the above-described functions while also providing transparent communication between keyboard 20 and PC 10 and telephones 30 and 32 and associated telephone lines 34 and 36. Of course, the operation of RS-232 ports 12 and 16 of PC 10 are unaffected by the operation of interface 24. Implementation of the above-described functions is described with reference to FIG. 4.

Figure 2:
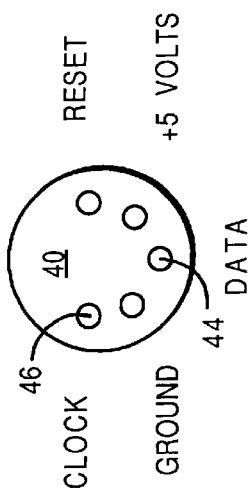
FIG. 2 is a pictorial end view of a standard PC keyboard connector showing its pinout configuration and signal assignments.
Figure 3:
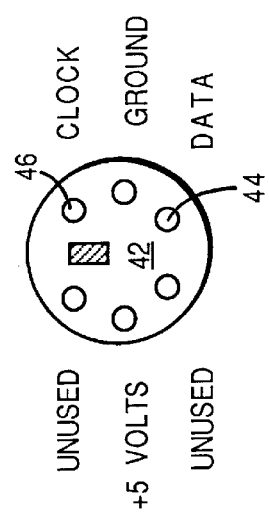
FIG. 3 is a pictorial end view of a standard laptop PC, PS1 PC, and PS2 PC keyboard connector showing its pinout configuration and signal assignments.

FIG. 2 shows the pinout configuration and signal assignments of a standard PC keyboard male connector end 40, and FIG. 3 shows the pinout configuration and signal assignments of a standard laptop PC, PS1 PC, and PS2 PC keyboard male connector end 42. Referring also to FIG. 1, keyboard 20 communicates with PC 10 via a serial ASCII data signal impressed on a half-duplex, bidirectional data line 44. The data signal is synchronously transferred from its source to its destination by a clock signal impressed on a clock line 46. The clock signal is generated by keyboard 20 for data transfers between keyboard 20 and interface 24, and by interface 24 for data transfers between interface 24 and PC 10.

Figure 4:
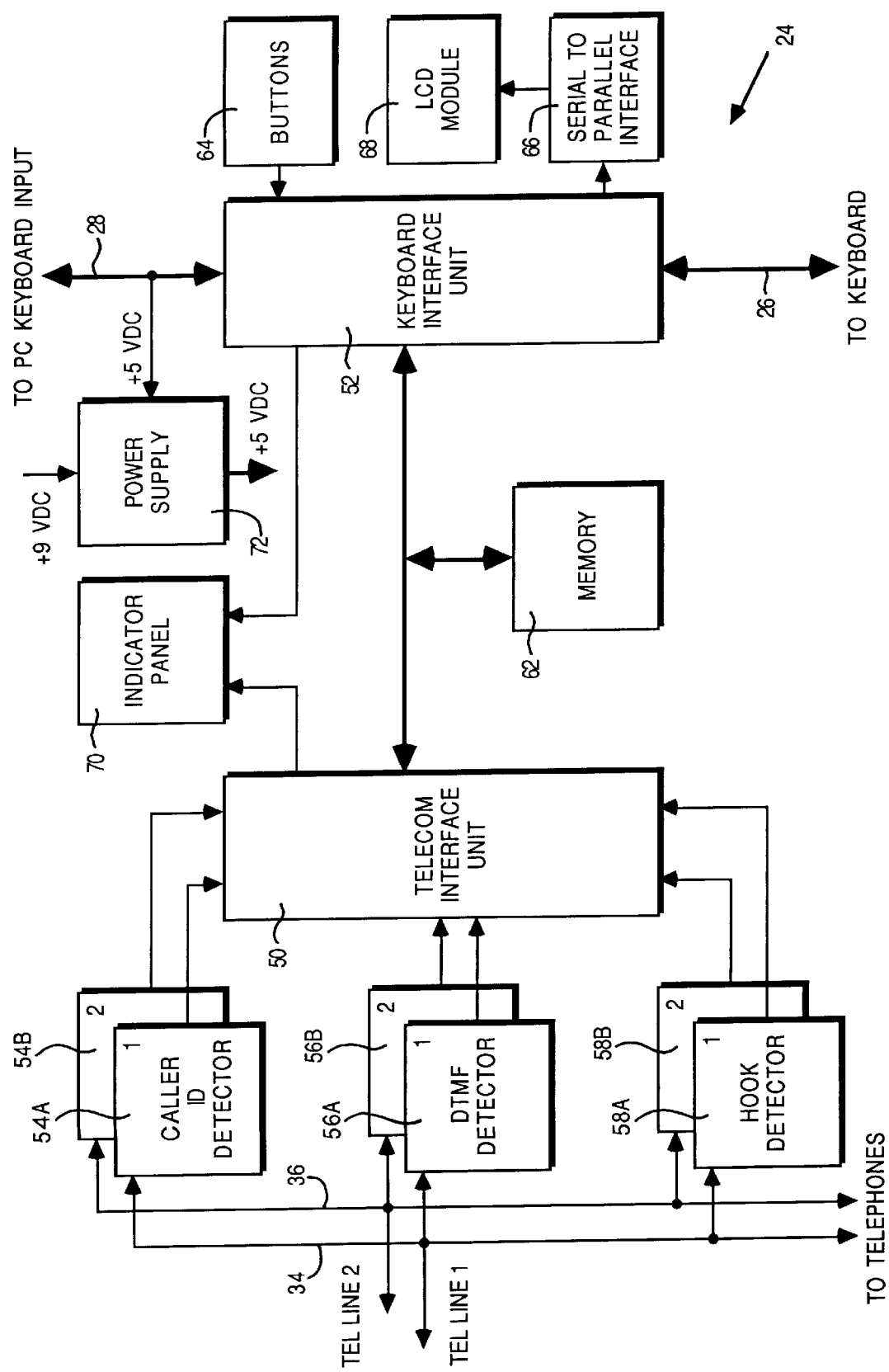
FIG. 4 is an electrical block diagram of a caller ID interface of this invention.

FIG. 4 shows internal details of interface 24. Two PIC16C73A RISC microprocessors manufactured by Microchip, Inc. are used to implement the respective functionalities of a telecommunication interface unit ("TIU") 50 and a keyboard interface unit ("KIU") 52. As their labels suggest, TIU 50 performs telecommunications-related functions and KIU 52 performs keyboard interface-related functions.

Telephone lines 34 and 36 are electrically connected to respective caller ID detectors 54A and 54B (collectively "caller ID detectors 54"), DTMF detectors 56A and 56B (collectively "DTMF detectors 56"), and hook detectors 58A and 58B (collectively "hook detectors 58"). Caller ID detectors 54 are built around Motorola Semiconductor MC145447 devices, DTF detectors 56 are built around Holtek HT9170 devices, and hook detectors 58 are line current sensors built around National Semiconductor LM-392 operational amplifier devices.

Caller ID detectors 54 detect ringing signals and demodulate incoming caller ID data present between the ringing signals on telephone lines 34 and 36 and convey ringing signal and demodulated caller ID data to TIU 50 for processing. DTMF detectors 56 decode outbound DThf data generated by telephones 30 and 32 and convey the decoded DTMF data to TIU 50 for processing. Hook detectors 58 determine whether either of telephones 30 or 32 is in an off-hook state and convey the hook state data to TIU 50 for processing.

The RISC microprocessor in TIU 50 further implements a real time clock and calendar function for time-stamping telephone call activity and an inter-unit communication protocol with KIU 52, which protocol is preferably a Philips IIC data transfer scheme operating on a single IIC bus.

The RISC microprocessor in KIU 52 further implements transparent data communication between first and second passthrough ports 26 and 28, data transfers to and from a memory 62, control functions commanded by user depressions of buttons 64, data transfers optionally through a serial-to-parallel interface 66 or preferably directly (shown in dashed lines) to a liquid crystal display ("LCD") module 68, PC 10 and keyboard 20 connection status, data transfers to an indicator panel 70, power on self test ("POST") results data transfers to indicator panel 70, and a portion of the IIC inter-unit communication protocol with TfU 50.

TIU 50 receives the ringing signal and demodulated caller ID data from caller ID detectors 54, decoded DTMF from DTMF detectors 56, and hook state data from hook detectors 58 to generate call record data. TIU 50 processes the caller ID data, hook state data, and real-time clock and calendar data to add time and date stamp and call duration data to relevant call records. TIU 50 transfers the call records to memory 62 for storage. Memory 62 is preferably a Microchip 24C32A IIC serial 32 K-bit EEPROM memory that is suitable for storing about 128 call records that are transferred on command to PC 10. Alternatively, a Microchip 24C65 64 K-bit memory may be used for storing about 240 call records. Buttons 64 transmit button data through KIU 52 to TITU 50 to set up the real-time clock and calendar and to command the display of stored call record data on LCD module 68. The latter function makes interface 24 usable in a stand alone mode without connection to PC 10 or keyboard 20. Of course, PC 10 may send commands to interface 24 to accomplish the same functions.

Indicator panel 70 preferably employs light emitting diodes ("LEDs") (not shown) to indicate the following conditions.

A first LED indicates when "blinking" that POST is in progress, when "on" that POST is passed, and when "off" that POST has failed.

A second LED for each of telephone lines 34 and 36 indicates when "blinking" that a ringing signal is detected, when "on" that associated telephones 30 and 32 are in an off-hook state, and when "off" that associated telephones 30 and 32 are in an on-hook state. The blinking of the second LED is preferably synchronized with the receipt of caller ID data.

A third multicolor LED indicates, as shown in Table 1, whether keyboard 20 and PC 10 are connected respectively to first and second passthrough ports 26 and 28.

TABLE 1

| Keyboard 20 Connected? | PC 10 Connected | LED |
|---|---|---|
| No | No | Off |
| No | Yes | Red |
| Yes | No | Yellow (Red + Green) |
| Yes | Yes | Green |

A power supply 72 receives unregulated nine-volt DC power from a conventional wall receptacle-mounted power supply (not shown) and provides regulated five-volt DC power to interface 24. Power supply 72 also receives from PC 10 through second passthrough port 28, a five-volt DC signal that may be used as a power source when PC 10 is turned on. Therefore, if standalone operation of interface 24 is not required, the wall receptacle-mounted power supply is not required.

The above-described TIU 50 telecommunications-related functions and KIU 52 keyboard interface-related functions are implemented in software generally according to the following description.

KIU 52 receives data from keyboard 20 and transfers them unaltered to PC 10. Likewise, data from PC 10 directed to keyboard 20 are received by KIU 52 and transferred unaltered to keyboard 20. All data generated by or directed to interface 24 are preceded by a single tag byte, preferably E8 hexadecimal. Because keyboard 20 data have a higher priority, data transfers preceded by the tag byte can occur only when there is no keyboard 20 data being transferred. Data transfers among interface 24, keyboard 20, and PC 10 conform to the conventional protocols employed between keyboard 20 and PC 10.

Data types transferred between interface 24 and PC 10 include commands, control information, and call record data. Table 2 shows the preferred data contents for transferring commands from PC 10 to interface 24. Each data byte transferred between PC 10 and interface 24 is preceded by the E8 hexadecimal tag byte. Bold data shown in Table 2 are responses from interface 24 to PC 10.

TABLE 2

| COMMAND | DATA |
|---|---|
| Echo | EE, EE |
| Clock Set | F2, FA, YEAR, FA, Month, FA, DAY, FA, HOUR, FA, MIN, FA, SEC, FA |
| Call Records Stored | F3, F8, NO_OF_RECORDS (0–127 [7F] or 0–240 [E0]) |
| Resend Call Record | F4, RECORDS <Last> |
| Send Call Record | F5, RECORD <01> |
| Send Call Record NN | F6, 0FAH, NN, RECORD <NN> |
| Memory Clear | F7, FA |
| Memory All Clear | F8, FA |
| Disable Scanning | F9, FA |
| Enable Scanning | FA, FA |
| Configure | FB, FA, SW_CFG, FA |
| Set Default | FC, FA |
| Read ID | FD, FB |
| Resend Byte | FE, LAST_BYTE_SENT |
| Reset | FF, EF, HW_CFG or FC, ERROR |

The preferred call record identification format is:

RECORD<Last>: F9, Last, [32 byte call record], FA;

RECORD<01>: F9, 01, [32 byte call record], FA;

RECORD<NN>: F9, NN, [32 byte call record], FA;

where F9 and FA are start and final delimiters, and "Last," "01," and "NW" are particular call record identification numbers.

For inbound calls the preferred 32 byte call record data format is:

| For inbound calls the preferred 32 byte call record data format is: | | |
|---|---|---|
| 1 byte: | 0, 0, | CallType (1 bit), TelLine (1 bit), Month (max 12, 4 bits bin) CallType: 0 = Outbound, 1 = Inbound TelLine: 0 = Line 1, 1 = Line2 |
| 1 byte: | 0, 0, | 0, Day (max 31, 5 bits binary) |
| 1 byte: | 0, 0, | WrongTimeTag (1 bit), Hours (max 23, 5 bits binary) WrongTimeTag: 1 = possible wrong time |
| 1 byte: | 0, 0, | Minute (Max 59, 6 bits binary) |
| 3 bytes: | | Duration (6 digit in binary nibbles - packed) |
| 5 bytes: | | Telephone Number (10 digit in binary nibbles - packed) |
| 19 bytes: | | Name (19 digit ASCII) |
| 1 byte: | | Check Sum (7 bit sum of the previous 31 bytes) |
| For outbound calls the preferred 32 byte call record data format is: | | |
| 1 byte: | 0, 0, | CallType (1 bit), TelLine (1 bit), Month (max 12, 4 bits bin) CallType: 0 = Outbound, 1 = Inbound TelLine: 0 Line 1, 1 = Line 2 |
| 1 byte: | 0, 0, | 0, Day (max 31, 5 bits binary) |
| 1 byte: | 0, 0, | WrongTimeTag (1 bit), Hours (max 23, 5 bits binary) WrongTimeTag: 1 = possible wrong time |
| 1 byte: | 0, 0, | Minute (max 59, 6 bits binary) |
| 3 bytes: | | Duration (6 digit in binary nibbles - packed) |
| 24 bytes: | | Telephone Number (24 digit ASCII) |
| 1 byte: | | Check Sum (7 bit sum of the previous 31 bytes) |

Interface 24 may operate according to a particular software determined configuration. Accordingly, a software configuration byte, "SW_CFG," identifies the current software determined configuration of interface 24, the default configuration being SW_CFG=00. Software configuration options are preferably defined as follows:

| SW_CFG: |
|---|
| Bit 0: 0 = PC time |
|     1 = Phone time |
| Bit 1: 0 = Store call records into memory |
|     1 = Do not store call records into memory |
| Bit 2: 0 = Stop call record storage when memory is full |
|     1 = Overwrite call record on First In First Overwritten basis |
| Bit 3: 0 = Clear call record from memory only when PC commands |
|     1 = Clear immediately when record is sent to PC |
| Bit 4: 0 = Send fresh call records to PC only if no other record is in queue |

-continued

| SW_CFG: |
|---|
| 1 = Send fresh records anyway |
| Bit 5: 0, not used. |
| Bit 6: 0, not used. |
| Bit 7: 0, not used. |

Memory 62 is preferably a 64 K-bit memory but may alternatively have a different storage capacity, such as 32 K bits. The maximum call record storage capacity is affected accordingly such that the number of call records, NO_OF_RECORDS, can be 0 to 127 [7F] if a 32 K-bit memory is used or 0 to 240 [E0] if a 64 K-bit memory is used. The memory storage capacity is reported by a Reset return hardware configuration byte identified as HW_CFG. The preferred data format for HW_CFG is:

| HW_CFG: | |
|---|---|
| Bit 0: | 0 = 32K-bit storage memory (Maximum 127 call records) |
| | 1 = 64K-bit storage memory (Maximum 240 call records) |
| Bit 1: | 0, not used. |
| Bit 2: | 0, not used. |
| Bit 3: | 0, not used. |
| Bit 4: | 0, not used. |
| Bit 5: | 0, not used. |
| Bit 6: | 0, not used. |
| Bit 7: | 0, not used. |

The POST results are reported in an error byte, ERROR, which identifies failed interface 24 components. The preferred ERROR data format is:

| ERROR: |
|---|
| Bit 0: 1 = Program code checksum failure |
| Bit 1: 1 = Data RAM memory failure |
| Bit 2: 1 = Storage memory failure |
| Bit 3: 1 = Timer failure |
| Bit 4: 1 = Buttons failure |
| Bit 5: 1 = TIU and KIU communication failure |
| Bit 6: 1 = Keyboard communication failure |
| Bit 7: 0, not used. |

Table 3 shows the preferred data contents for transferring commands and data from interface 24 to PC 10. As before, each data byte transferred between interface 24 and PC 10 is preceded by the E8 tag byte, and Bold data are responses from PC 10 to interface 24. Interface 24 does not expect any response from PC 10 except in response to a Resend Byte command. In Table 3, real-time clock and calendar values are binary numbers formatted as: MONTH(12), DAY(31), HOUR(23), and MIN(59).

TABLE 3

| COMMAND | DATA BYTES |
|---|---|
| Echo | EE |
| Reset POST Pass | EF, HW_CFG |
| Phone Clock Set | F6, MONTH, DAY, HOUR, MIN, FA |
| Telephone Line Status | F7, TEL_STATE, FA |
| Records Stored Response | F8, NO_OF_RECORDS (0–127 [7F] or 0–240 [E0]) |
| Send Fresh Record | RECORD <00> |
| Acknowledge | FA |
| Interface Identity | FB |
| Reset POST Fail | FC, ERROR |
| Memory Full Warning | FD |

TABLE 3-continued

| COMMAND | DATA BYTES |
|---|---|
| Resend Byte | FE, LAST_BYTE_SENT |
| Memory Full (Records Lost) | FF |

A 00 record number indicates that an inbound call has just arrived and has a "0" duration. The preferred data format is:
RECORD<00>: F9, 00, [32 byte call record], FA; where F9 and FA are the start and fmal delimiters.

A TEL_STATE byte reports the current state of telephone lines 34 and 36. Interface 24 sends the TEL_STATE byte to PC 10 whenever there is a change in the state of either telephone line 34 or 36. TEL_STATE is also sent in response to a RESET command from PC 10 or following an interface 24 power-on reset. The preferred TEL_STATE data formats are shown below for inbound and outbound calls.

| TEL_STATE (Inbound calls): |
|---|
| Bits 0 and 1: Telephone line 1 status (see Table 4) |
| Bits 2 and 3: Telephone line 2 status (see Table 4) |
| Bit 4: 0 = line 1, 1 = line 2 |
| Bit 5: 0 = outbound call, 1 = inbound call |
| Bit 6: 1 = keyboard communications failed |
| Bit 7: 0, not used |
| Bit 8: 0, not used |

TABLE 4

| STATUS | BIT 1 (BIT 3) | BIT 0 (BIT 2) |
|---|---|---|
| Idle (On-Hook) | 0 | 0 |
| Busy (Off-Hook) | 0 | 1 |
| Ringing | 1 | 0 |
| Invalid | 1 | 1 |

| TEL_STATE (Outbound calls): |
|---|
| Bits 0, 1, 2, 3: Dialed out digit (4 bits binary) |
| Bit 4: 0 = line 1, 1 = line 2 |
| Bit 5: 0 = outbound call, 1 = inbound call |
| Bit 6: 1 = keyboard communications failed |
| Bit 7: 0, not used |
| Bit 8: 0, not used |

A keyboard device driver installed in PC 10 scans every data byte received at keyboard port 22 for the presence of the E8 tag byte. Data bytes not preceeded by the tag byte are processed by PC 10 in the usual manner. Every byte preceeded by the tag byte is stripped from the normal data flow by PC 10 and redirected within PC 10 for processing that is logically consistent with the above-described functions and data formats.

Likewise, every data byte received by interface 24 is scanned by KIU 52 for the presence of the E8 tag byte. Data bytes not preceeded by the tag byte are passed through to keyboard 20 in the usual manner. Every byte preceded by the tag byte is redirected within interface 24 for logical processing consistent with the above-described functions and data formats.

Skilled workers will understand how to program the RISC microprocessors in TIU 50 and MIU 52 and the keyboard device driver in PC 10 using their own choice of software language to implement the above-described data formats, functions, and data flows. Preferably a Microchip PIC development environment is employed for programming interface 24 and a Microsoft device driver environment develops the tag byte detecting device driver and Visual Basic develops application programs for PC 10.

Skilled workers will further recognize that portions of this invention may be implemented differently from the implementations described above for a preferred embodiment. For example, a variety of different microprocessor types, logic circuits, display modules, telecommunications devices, data formats, commands, data transfer protocols, and keyboard interconnections may be employed to implement the same invention.

It will be obvious to those having skill in the art that many changes may be made to the details of the above-described embodiment of this invention without departing from the underlying principles thereof. Accordingly, it will be appreciated that this invention is also applicable to computer interface applications other than caller ID applications. The scope of the present invention should, therefore, be determined only by the following claims.

We claim:

1. Apparatus for conveying data to and from a personal computer that bidirectionally communicates with a keyboard through a keyboard port, comprising:

at least a first bidirectional data line;

a data interface unit coupled to at least the first bidirectional data line for conveying the data; and a keyboard interface unit electrically connected in line between the keyboard and the keyboard port for transparently transferring keyboard data bidirectionally between the keyboard and the keyboard port of the personal computer, the keyboard interface further electrically connected to the data interface unit for transferring the data between the data interface unit and the personal computer, each byte of the data accompanied by a tag byte.

2. The apparatus of claim 1 in which the data are telecommunication data, the first bidirectional data line is a telephone line, and the data interface unit is a telecommunications interface unit.

3. The apparatus of claim 2 further including at least a second telephone line and in which the telecommunications interface unit is coupled to at least the first and second telephone lines for detecting the telecommunications data.

4. The apparatus of claim 2 further including a caller identification ("ID") detector interconnected between the first telephone line and the telecommunications interface unit and in which the telecommunications data include caller ID data associated with an inbound telephone call.

5. Apparatus for detecting telecommunications data on at least a first telephone line and transferring the telecommunications data to a personal computer that bidirectionally communicates with a keyboard through a keyboard port, comprising:

a telecommunications interface unit coupled to at least the first telephone line for detecting the telecommunications data; and a keyboard interface unit electrically connected in line between the keyboard and the keyboard port for transparently transferring keyboard data bidirectionally between the keyboard and the keyboard port of the personal computer, and the keyboard interface electrically connected to the telecommunications interface unit for transferring the telecommunications data between the telecommunications interface unit and the personal computer.

6. The apparatus of claim 5 further including at least a second telephone line and in which the telecommunications interface unit is coupled to at least the first and second telephone lines for detecting the telecommunications data.

7. The apparatus of claim 5 further including a caller identification ("ID") detector interconnected between the first telephone line and the telecommunications interface unit and in which the telecommunications data include caller ID data associated with an inbound telephone call.

8. The apparatus of claim 5 further including a dual tone multi-frequency ("DTMF") detector and a hook detector interconnected between the first telephone line and the telecommunications interface unit and in which the telecommunications data include at least one of DTMP data and hook state data associated with an outbound telephone call.

9. The apparatus of claim 5 in which the keyboard interface unit differentiates the telecommunications data from the keyboard data by inserting a tag byte ahead of each data byte in the telecommunications data.

10. The apparatus of claim 5 in which the telecommunications interface unit further appends time and date stamp data to the telecommunications data.

11. The apparatus of claim 5 in which the keyboard interface unit and the telecommunications interface unit are implemented by at least one microprocessor.

12. The apparatus of claim 5 further including a memory in data communications with the keyboard interface unit and the telecommunications interface unit, the memory storing the telecommunications data for transfer to the personal computer at a time when the keyboard data are not being transferred to the personal computer.

13. The apparatus of claim 12 in which the telecommunication data include a call record associated with each telephone call detected on at least the first telephone line, each call record including at least one of an inbound call identifier, an outbound call identifier, a telephone line identifier, a call time stamp, a call date stamp, a call duration stamp, an inbound call caller ID, and an outbound call telephone number.

14. The apparatus of claim 12 further including a display associated with the keyboard interface unit for displaying at least one call record stored in the memory.

15. A method of installing and operating a caller ID interface on a personal computer that bidirectionally communicates with a keyboard through a keyboard port, comprising the steps of:

unplugging the keyboard from the keyboard port;

plugging the keyboard into a first passthrough port on the caller ID interface;

connecting a second passthrough port of the caller ID interface into the keyboard port;

tagging with a tag byte caller ID data detected by the caller ID interface; and installing a device driver in the personal computer, the device driver normally processing keyboard data transparently passed through the caller ID interface and detecting and logically redirecting caller ID data tagged by the tag byte.

16. The method of claim 15 in which the device driver further executes the step of tagging with the tag byte control data directed to the caller ID interface.

17. The method of claim 15 further including storing the caller ID data in a memory and transferring the stored caller ID data to the personal computer when no keyboard data are passing through the caller ID interface.

18. The method of claim 15 in which the caller ID interface further executes the steps of:

monitoring at least one telephone line;

detecting the caller ID data on an inbound call received on at least the one telephone line;

appending the caller ID data to a call record; and storing the call record in a memory in the caller ID interface.

19. The method of claim 15 in which the caller ID interface further executes the steps of:

monitoring at least one telephone line;

detecting telephone number data on an outbound call transmitted on at least the one telephone line;

appending the telephone number data to a call record; and storing the call record in a memory in the caller ID interface.

20. The method of claim 15 in which the caller ID interface further executes the steps of:

monitoring at least one telephone line;

generating real-time clock data;

detecting telephone hook state data associated with a telephone call monitored on at least the one telephone line;

processing the hook state data and the real-time clock data to compute call duration data associated with the telephone call;

appending the call duration data to a call record; and storing the call record in a memory in the caller ID interface.

* * * * *